United States Patent [19]

Lunn et al.

[11] Patent Number: 5,193,217

[45] Date of Patent: Mar. 9, 1993

[54] LOW VOLTAGE IC FOR VOICE OPERATED TRANSCEIVER

[75] Inventors: Gerald K. Lunn, Harbour City; Man Chan, Ha Che; Chi M. Lin, Kowloon, all of Hong Kong

[73] Assignee: Motorola, Inc., Schaumburg, Ill.

[21] Appl. No.: 513,453

[22] Filed: Apr. 23, 1990

[51] Int. Cl.⁵ ............................................. H04B 1/46
[52] U.S. Cl. ...................................... 455/79; 455/83; 381/46
[58] Field of Search ................ 459/78, 79, 82, 83, 459/89, 354, 355; 381/58, 46

[56] References Cited

U.S. PATENT DOCUMENTS

| | | |
|---|---|---|
| 3,169,221 | 2/1965 | Franchi ........................... 455/79 |
| 3,397,401 | 8/1968 | Winterbottom ................... 455/79 |
| 3,944,736 | 3/1976 | Shepard ........................... 358/185 |
| 3,962,553 | 6/1976 | Linder et al. ..................... 455/79 |
| 4,860,359 | 8/1989 | Eicher .............................. 455/79 |

*Primary Examiner*—Reinhard J. Eisenzopf
*Assistant Examiner*—Edward Urban
*Attorney, Agent, or Firm*—Eugene A. Parsons

[57] ABSTRACT

A portable transceiver with a transmit/receive switch which includes an audio amplifier, level detector and comparator all direct coupled and included on a single integrated chip. The comparator includes one input that has a slow attack time and a fast decay time for differentiating between slow changing background noise and fast bursts of voice so that the transceiver is voice operated.

5 Claims, 2 Drawing Sheets

LOW VOLTAGE IC FOR VOICE OPERATED TRANSCEIVER

The present invention pertains to voice operated portable transceivers and, more particularly, to low votage operated integrated circuits for controlling transmit/receive switches in transceivers.

BACKGROUND OF THE INVENTION

Conventional portable transceivers, such as portable one-way radios, are controlled with a mechanical push-to-talk switch which must be depressed manually each time the operator wants to transmit. In many instances the manual operation is inconvenient. As a simple example, repairmen receiving instructions by radio may need both hands to do the repairs. Many other instances where handfree operation would be convenient, or even necessary, will be apparent to operators as well as those skilled in the art.

Some speaker phones for telephones and the like contain circuits that are voice operated. However, these circuits are relatively complex and require large amounts of voltage and power. Clearly, such circuits could not be used in portable transceivers where the amount of voltage, power usage and size are crucial.

SUMMARY OF THE INVENTION

It is an object of the present invention to provide an improved portable transceiver with voice operated transmit/receive switch.

It is a further object of the present invention to provide an improved low voltage operated integrated circuit for controlling a transceiver transmit/receive switch.

It is a further object of the present invention to provide a low voltage operated integrated circuit for controlling and/or operating a transceiver transmit/receive switch having direct coupled circuits and no more than eight external connections.

It is further object of the present invention to provide a low voltage operated integrated circuit for controlling and/or operating a transceiver transmit/receive switch, which integrated circuit includes external band width, gain, filter and trigger level adjustments.

These and other objects are realized in a portable transceiver including a transmitter, a receiver and a transmit/receive switch constructed to receive audio input signals from a microphone or the like and to turn on the transmitter when the input signals being received include a voice signal. The transmit/receive switch includes a low voltage operated integrated circuit with a comparator therein for differentiating between relatively slow changing background noise and bursts of voice.

DESCRIPTION OF THE PREFERRED EMBODIMENT

Figure 1:
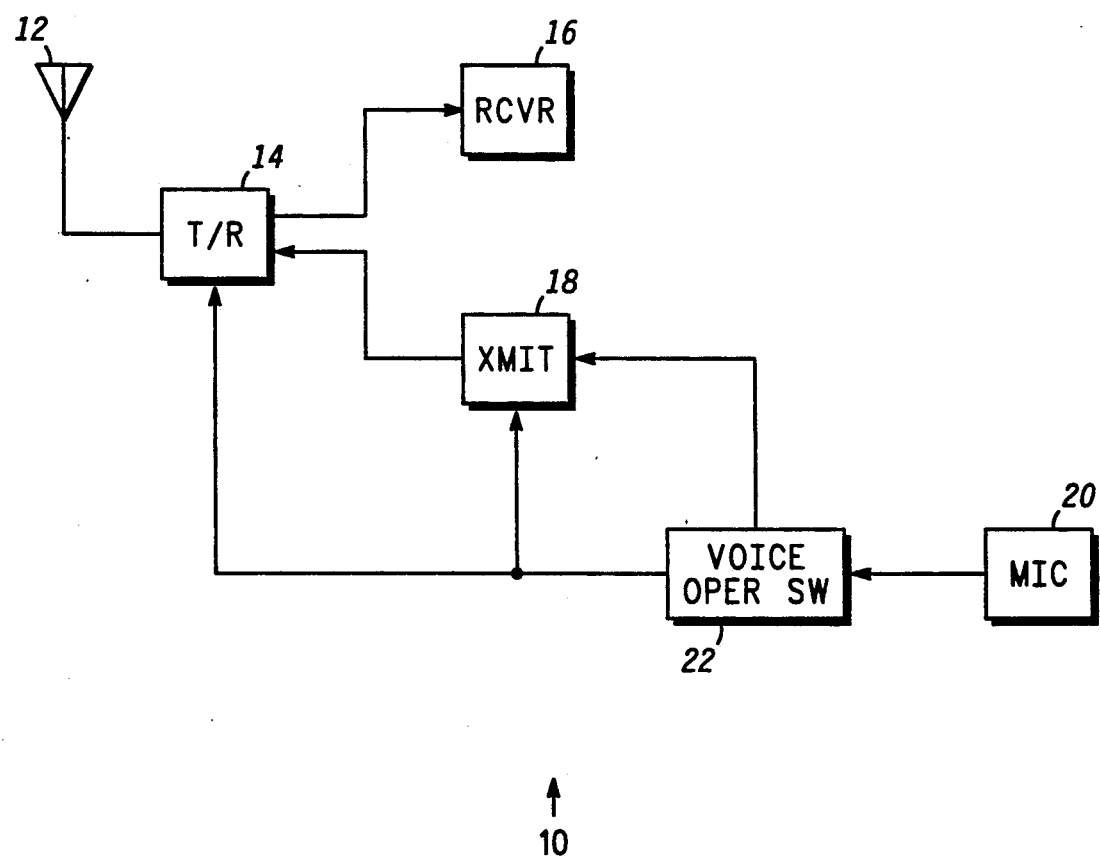
FIG. 1 is a simplified block diagram of a typical portable transceiver employing the present invention.

Referring specifically to FIG. 1, a simplified block diagram of portable transceiver 10 is illustrated. Transceiver 10 includes an antenna 12, a diplexer 14 or other device for allowing the use of a single antenna for transmitting and receiving, a receiver 16, a transmitter 18 and a microphone 20. In this preferred embodiment microphone 20 is connected to the signal input of transmitter 18 through a voice operated switch 22. Voice operated switch 22 includes an audio amplifier that supplies voice signals from microphone 20 directly to transmitter 18. Further, voice operated switch 22 senses the voice signal and actuates, or turns on, transmitter 18 in response thereto. In some types of transceivers the diplexer and other circuits may be operated by the push-to-talk switch and under such circumstances voice operated switch 22 will perform the switching function or may simply control the various switches that control these circuits.

Figure 2:
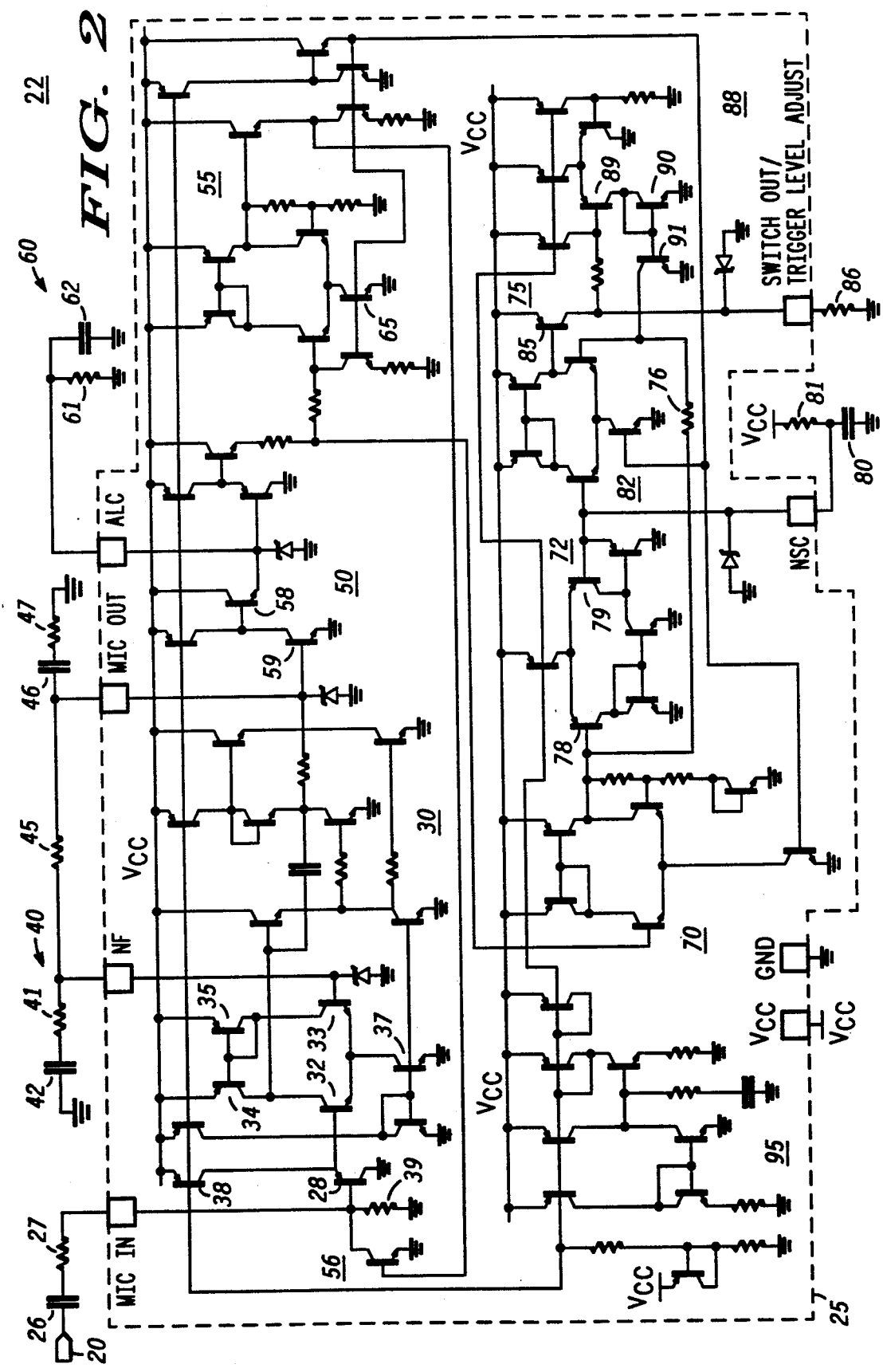
FIG. 2 is a schematic diagram of a low voltage operated integrated circuit embodying the present invention.

Referring specifically to FIG. 2, a preferred embodiment of voice operated switch 22 is illustrated in schematic form. The circuit of voice operated switch 22 is included in an integrated circuit on a semiconductor chip designated 25 by the enclosed in the broken line. Microphone 20 is connected through bypass capacitor 26 and resistor 27, which are located off chip 25, to a first external connection pad, labelled MIC IN, on chip 25. The MIC IN pad is connected directly to the base of PNP emitter-follower input stage 28 of an audio pre-amplifier generally designated 30. Pre-amplifier 30 includes differential pair of NPN transistors 32 and 33 with an active loading circuit including PNP transistor pair 34 and 35 and a current source, NPN transistor 37. This circuit is different than conventional circuits in that current source transistor 37 is operated with a very small $V_{CE}$ of below approximately 0.1 volts. This low operating voltage is due to the fact that the base voltage of transistor 32 is biased at approximately 0.7 volts, which is the $V_{be}$ (base-emitter junction potential) of input stage 28. Input stage 28 receives current from current source 38. A small base biasing current of 1 uA is drawn through a resistor 39 to ground. The input DC voltage of pre-amplifier 30 is equal to the current flowing through resistor 39 times the resistance value. In this embodiment the value of resistor 39 is 20K ohms so that the input DC voltage is 2 millivolts, or close to zero. The output DC voltage is set at approximately 0.62 volts by using a ten to one emitter area for transistor 33.

The base of transistor 33 is connected through an external connection pad, labelled NF, to an impedance 40, made up of a series connected resistor 41 and capacitor 42 having one terminal connected to ground. External connection pad NF is connected through an external impedance (resistor) 45 to an external connection pad labelled MIC OUT, which is in turn connected to the output of pre-amplifier 30. The MIC OUT pad is also connected through series connected capacitor 46 and resistor 47 to ground. The gain and band width of pre-amplifier 30 can be changed or varied by using differnt designs, including types and sizes of components, for impedances 40 and 45 and capacitor 46. Resistor 47 is a load resistor for pre-amplifier 30.

The output of pre-amplifier 30 is also connected directly to a level detector 50, which is in turn connected directly to a feedback amplifier 55, including an attenuator circuit 56. Detector 50, amplifier 55 and attenuator circuit 56 form an automatic level control (ALC) circuit. Level detector 50 includes an NPN transistor 58, which provides the detector function and operates similar to a half-wave rectifier, and an emitter follower 59 connected to receive the output signals from pre-amplifier 30 and supply them to the base of transistor 58.

The emitter of transistor 58 is connected to an external connection pad, labelled ALC, and through an external filter 60, including a resistor 61 and a capacitor 62 connected in parallel, to ground. Filter 60 determines the attack time constant of level detector 50, which is the resistance between the collector and emitter of transistor 58 times the capacitance of filter 60. Also, filter 60 is external to the semiconductor chip 25 so that it can be easily changed if desired.

Feedback amplifier 55 is designed similar to pre-amplifier 30 and includes a current source 65 with a $V_{CE}$ less than about 0.1 volts. Attenuator circuit 56, in this embodiment, is a single NPN transistor with the base connected to the output of feedback amplifier 55 and the collector connected to the base of input stage 28 of pre-amplifier 30. The single transistor is designed to obtain both low voltage operation (near 0 volts) and high attenuation ratios (>50 dB). This is achieved by clamping the $V_{CE}$ of attenuator circuit 56 close to zero volts and by providing a 16×emitter area NPN transistor to obtain high attenuation ratios. The attenuation ratio is equal to:

$$ALC \text{ attenuation ratio} = 20 In[R_{ce}/(R_{ce}+R_{27})]dB.$$

Thus, the attenuation range is changed by changing the value of resistor 27 in the microphone circuit.

The output signals from level detector 50 are connected directly through a level amplifier 70 to a noise monitor 72, and a comparator 75. Level amplifier 70 is a DC level amplifier similar to pre-amplifier 30, with the base biasing voltage of the differential amplifier being set at approximately a $V_{be}$ of 0.7 volts. Level amplifier 70 has a voltage gain of approximately 4 dB and supplies an output signal to an input of noise monitor 72 and, through a resistor 76, to a negative input of comparator 75.

Noise monitor 72 includes a pair of PNP transistors, 78 and 79, differentially connected to provide an input for signals from level amplifier 70 at a base of transistor 78. The base of transistor 79 is connected to an external connection pad, labelled NSC (noise storage capacitor), which is in turn connected through a capacitor 80 to ground and through a resistor 81 to $V_{CC}$. The base of transistor 79 is also connected to the emitter of PNP transistor 82, the collector of which is connected to ground and the base of which is connected to the emitter of transistor 79. The base of transistor 79 is further connected to a positive input of comparator 75. Noise monitor 72 has a slow attack time, determined by the values of resistor 81 and capacitor 80, and a fast decay time, determined by the $R_{ce}$ of transistor 82 and the value of capacitor 80. Since resistor 81 and capacitor 80 are located off of chip 25, they are easily changed to adjust the attack and delay times.

Comparator 75 is a two input differential amplifier with the output of level amplifier 70 connected to the positive input through noise monitor 72 and to the negative input through resistor 76. Resistor 76 shifts down the level amplifier output by the voltage drop across resistor 76 so that, in the idle case, the positive input of comparator 75 has a higher DC voltage of $I_{76} \times R_{76}$. When the voltage of the negative input becomes higher than the voltage of the positive input, the conduction of comparator 75 reverses. This reversal turns on a PNP switch output transistor 85, the collector of which is connected to an external connection pad labelled SWITCH OUT/TRIGGER LEVEL ADJUST and through an external load resistor 86 to ground, to raise the output voltage and provide a switching action.

The operation of level amplifier 70, noise monitor 72 and comparator 75 is based on the fact that the level change of background noise is always slower than voice, which appears as bursts. Therefore, if the attack time constant of noise monitor 72 is selected to approach the fundamental cycle of a background noise, the positive input of comparator 75 is always higher than the negative input until a voice signal is present. When a voice signal is present, the voltage rises at the negative input of comparator 75 faster than at the positive input because the signal at the positive input is delayed by charging of capacitor 80. When the voltage level at the negative input rises above the voltage level at the positive input, comparator 75 reverses conduction and drives switch output transistor 85 to produce the switching action. It should be noted that the switching action of transistor 85 can be used directly in place of a mechanical transmit/receive (push-to-talk) switch and/or it can be used to control other mechanical and/or electrical switching circuits utilized to replace the push-to-talk switch.

A trigger level adjust circuit 88 is connected to external load resistor 86 and to resistor 76. When the positive input of comparator 75 is high and transistor 85 is cut-off, resistor 86 is used to adjust the DC voltage at the base of PNP input transistor 89 of circuit 88. Transistor 89 determines the amount of current flowing through NPN transistor 90, which is mirrored in a second NPN transistor 91 the collector of which is connected to resistor 76. The current flowing in transistor 91 determines the voltage drop across resistor 76 and, thus, the DC offset voltage between the inputs of comparator 75. Therefore, external resistor 86 can be used to adjust the trigger level of comparator 75 and the voice switch 22. It will of course be understood that some or all of the external adjustable components, such as resistor 86, can be made continuously adjustable, if desired, by including a variable resistor or the like. When output transistor 85 is turned on, transistor 89 is in a cutoff state and resistor 86 is used only as a load resistor.

A circuit 95 is connected to all of the circuits and is used as a current reference. The operation of circuit 95 is believed to be conventional and will not be discussed further herein. Also, all of the circuits described herein are designed to be direct coupled, i.e. no coupling capacitors, so that the entire circuit can readily be integrated on a single semiconductor chip, as shown. To further enhance the integration of the described voice switch, the output pads have been reduced to eight from the number twelve that would normally be needed. This reduction has been accomplished by the dual use of several pads as, for instance, the dual use of the SWITCH OUT/TRIGGER LEVEL ADJUST pad. Further, the circuit is designed to have a minimum number of external components. Also, the amplifiers and other circuits throughout the voice operated switch use differential stages with constant current sources operating under very low $V_{CE}$ (<0.1 volts), which is important for low voltage, low power consumption and high frequency integrated circuit design. The $V_{CE}$ is dropped below 0.1 volts by using low current and low collector saturation resistances throughout the circuits. Low collector saturation resistances can be obtained, for example, by optimizing the NPN device layout. In this embodiment the semiconductor chip 25 is able to operate with a $V_{CC}$ under 1.8 volts.

Thus, a new and improved voice operated switch has been disclosed which requires a low operating voltage and which is integrated onto a single semiconductor chip with a minimum number of external connection pads and external components. Because of the low operating voltage and small size, the switch can be used in portable transceivers and the like. Further, the switch is reliably controlled by voice signals so that it can be used in transceivers and the like in a "hands-free" operation. Also, band width, gain, filter characteristics and trigger levels can be easily adjusted external to the integrated circuit for different applications and areas of operation.

While we have shown and described a specific embodiment of the present invention, further modifications and improvements will occur to those skilled in the art, we desire it to be understood, therefore, that this invention is not limited to the particular form shown and we intend in the appended claims to cover all modifications that do not depart from the spirit and scope of this invention.

We claim:

1. A portable transceiver comprising:
   a transmitter;
   a receiver; and
   a transmit/receive switch coupled to the transmitter and having a microphone operatively connected thereto, the transmit/receive switch being constructed to receive input signals from the microphone and to turn on the transmitter only when the input signals include a voice signal, the transmit/receive switch including
   and audio amplifier coupled to receive input signals from the microphone and including variable circuitry providing a variable gain and bandwidth,
   a level detector connected to the audio amplifier for providing an output level signal corresponding to the level of input signals applied to the audio amplifier,
   a level adjusting circuit coupled to the level detector and the audio amplifier and providing automatic level control and including variable circuitry providing variable level detecting attack time and variable attenuation,
   a noise monitoring circuit coupled to receive the output level signal from the level detector and including variable circuitry providing a variable attack and decay time connected to produce an output signal from the noise monitoring circuit when a voice signal occurs in the input signal of the audio amplifier,
   a comparator circuit having two inputs and coupled to receive the output level signal from the level detector at one input and the output signal from the noise monitoring circuit at the other input,
   the comparator circuit further including a trigger level and a circuit for adjusting the trigger level, the comparator being connected to supply a switching signal to the transmitter and including variable circuitry for adjusting the trigger level of the comparator,
   the audio amplifier, the level detector, the level adjusting circuit, the noise monitoring circuit, and the comparator circuit all being direct coupled circuits and all being formed as an integrated circuit which operates in a range below approximately 1.8 volts.on a single semiconductor chip, and
   no more than eight external connections to the integrated circuit connecting the variable circuitry included in the audio amplifier, the variable circuitry included in the level adjusting circuit, the variable circuitry included in the noise monitoring circuit, and the variable circuitry included in the trigger level adjusting circuit external to the integrated circuit, providing the coupling between the microphone and the audio amplifier and the coupling between the audio amplifier and the transmitter and, for connecting power and reference supplies to the integrated circuit.

2. The portable transceiver as claimed in claim 1 wherein the audio amplifier, the level adjusting circuit and the noise monitoring circuit each include differentially connected transistor stages with constant current sources which operate with a $V_{ce}$ below approximately 0.1 volts.

3. A low voltage operated integrated circuit for controlling transceiver transmit/receive switching, having no more that eight external connecting pads, comprising:
   an audio amplifier with a first external connecting pad adapted to receive input signals from a microphone and have variable attenuation circuitry attached thereto and second and third external connecting pads adapted to supply audio to a transceiver and to have connected thereto circuitry providing a variable gain and bandwidth for the audio amplifier;
   a level detector connected to the audio amplifier for providing an output level signal corresponding to the level of input signals applied to the audio amplifier;
   a level adjusting circuit coupled to the level detector and the audio amplifier and providing automatic level control with a fourth external connecting pad adapted to have connected thereto circuitry providing variable level detecting attack time;
   a noise monitoring circuit coupled to receive the output level signal from the level detector with a fifth external connecting pad adapted to have connected thereto circuitry providing a variable attack and decay time connected to produce an output signal from the noise monitoring circuit when a voice signal occurs in the input signal of the audio amplifier;
   a comparator circuit having two inputs and coupled to receive the output level signal from the level detector at one input and the output signal from the noise monitoring circuit at the other input,
   the comparator circuit further including trigger level adjusting circuitry having a sixth external connecting pad adapted to have connected thereto variable external switching level adjusting apparatus and to supply a switching signal to the transmitter;
   seventh and eighth external connecting pads included in the integrated circuit and adapted to have power and reference supplies attached thereto; and
   the audio amplifier, the level detector, the level adjusting circuit, the noise monitoring circuit, and the comparator circuit all being direct coupled circuits and all being formed as an integrated circuit which operates in a range below approximately 1.8 volts.on a single semiconductor chip.

4. The low voltage operated integrated circuit for controlling transceiver transmit/receive switching as claimed in claim 3 wherein the audio amplifier, the level adjusting circuit and the noise monitoring circuit each include differentially connected transistor stages with constant sources which operate with a $V_{ce}$ below approximately 0.1 volts.

5. A portable transceiver comprising:
a transmitter;
a receiver; and
a transmit/receive switch coupled to the transmitter and having a microphone operatively connected thereto, the transmit/receive switch being constructed to receive input signals from the microphone and to switch on the transmitter only when the input signals include a voice signal, the transmit/receive switch including an integrated circuit with no more than eight external connections to the integrated circuit with the microphone and variable attenuation circuitry connected to a first of the external connections, circuitry providing a variable gain and bandwidth and supplying an audio output to the transceiver connected to second and third external connections, circuitry providing variable level detecting attack time connected to a fourth of the external connections, circuitry providing a variable attack and decay time connected to produce an output signal when a voice signal is applied to the microphone connected to a fifth of the external connections, a sixth external connection connected to supply a switching signal to the transmitter and having attached thereto circuitry for adjusting the switching level, and seventh and eighth external connecting pads for connecting power and reference supplies to the integrated circuit.

* * * * *